D. G. LITTLEFIELD.
Base Burning Stove.
No. 1,814.
Reissued Nov. 8, 1864.
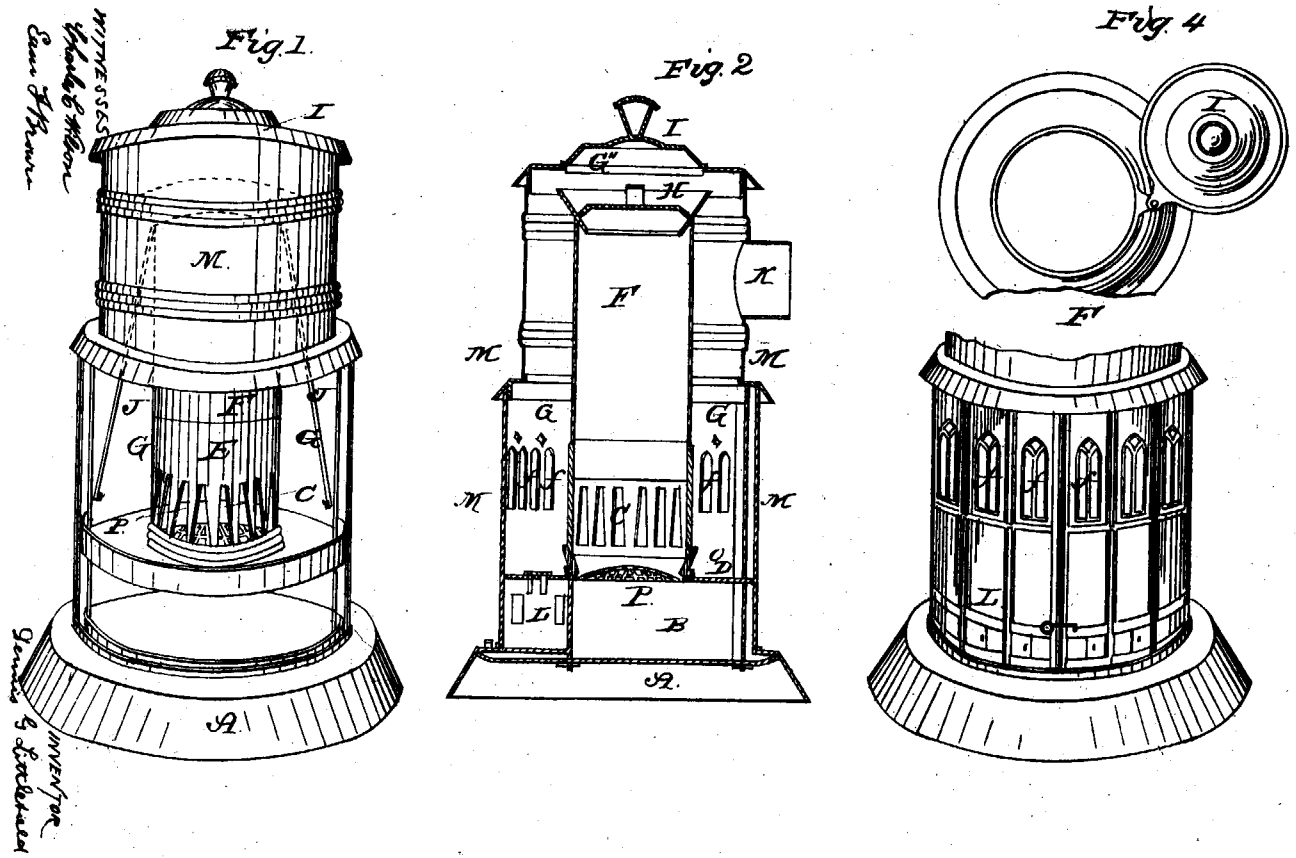
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,333, dated August 26, 1862; Reissue No. 1,427, dated March 3, 1863; Reissue No. 1,814, dated November 8, 1864.

DIVISION No. 2.

*To all whom it may concern:*

Be it known that I, DENNIS G. LITTLEFIELD, of Albany, in the county of Albany and State of New York, have invented new and useful Improvements in Stoves for Burning Anthracite and other Concentrated Fuels; and I do hereby declare the following to be a full, clear, and exact description of my invention, when taken in connection with the accompanying drawings and the letters of reference marked thereon, and which said drawings constitute part of this specification, and represent, in—

Figure 1, a perspective view of a cylindrical stove, a section of the outside casing removed to show the fire-pot; Fig. 2, a vertical central section of Fig. 1, showing the combination and arrangement of the various parts and their connection and adaptation to each other as here organized; Fig. 3, an illuminating-case, showing the arrangement thereof when combined with a stove in which a portion of its surface would be concealed by being placed against a wall or otherwise.

Similar letters indicate corresponding parts in the several figures.

My invention relates to an improvement in stoves which are supplied with an excess of fuel, and the excess or reserve fuel fed to the fire as fast as consumption takes place, and for which I have in even date herewith filed application for Letters Patent. Its object is to make the stove illuminating, as well as to serve for heating purposes.

To fully illustrate my invention, I will proceed to describe the same in connection with the accompanying drawings.

In my application before referred to my invention is confined to a dark stove, or close external case, or one which cannot illuminate without further invention.

As an engine for the combustion of concentrated fuels—such as anthracite—its adaptation is perfect. For inclosed heating-furnaces, and for all other purposes where it is not desirable to illuminate or impart heat by direct radiation, the organization therein exemplified may be used as a dark stove; but when used for warming the room in which the stove is placed it will be found advantageous to employ an illuminating outer case to the chamber G, for as that chamber receives both light and heat, as well as the gaseous products of combustion, from the burning fuel, the stove when in operation may be made to present the cheerful appearance of an open fire, reflecting light as well as heat into the room.

The construction of my illuminating-stove is substantially the same as described in the application before referred to. A is the base; B, the ash-pit; P, the fire-grate; D, the base of the fire-pot; E, the fire-pot; C, openings in the fire-pot through which the gaseous products of combustion and light from the burning coals pass to the chamber G. M M is the outer case of the chamber G; F, the supplying-cylinder; H, the cover to the same; I, the cover to the chamber G″; L, the air-supplying register, and K the smoke-flue. The external case, M M, of the chamber G is provided with openings *f f f*, fitted with mica or other material answering the same purpose, which, if the stove is to be placed in an apartment so as to be isolated and not in contact with the walls, may extend entirely around the case, or around so much of the case as is to be unconcealed and in full view. Thus constructed, a large portion of the heat as well as light will be radiated through the transparent openings, and to that extent afford the same quality of heat and cheerful appearance of an open fire.

I do not broadly claim the intent to make an opening in the exterior case of a stove through which the operation of the fire may be seen; but What I do claim as my invention, and desire to secure by Letters Patent, is—

The arrangement, adaptation, and combination, with a fuel-supplying cylinder-stove, of an illuminating-case to the chamber, which receives light and the gaseous products of combustion from the burning fuel, when said case is illuminated by windows or glazed apertures arranged continuously upon every side, or in so much of its surface as may be fully exposed to view, substantially in the manner and for the purpose herein set forth.

DENNIS G. LITTLEFIELD.

Witnesses:
CHARLES C. WILSON,
EDM. F. BROWN.